United States Patent
Nakaya et al.

(10) Patent No.: US 8,726,770 B2
(45) Date of Patent: May 20, 2014

(54) MACHINE TOOL

(75) Inventors: Takaichi Nakaya, Higashimurayama (JP); Shigeo Yanagidaira, Tokorozawa (JP); Koichi Yabe, Tokorozawa (JP)

(73) Assignees: Citizen Holdings Co., Ltd., Tokyo (JP); Citizen Machinery MIyano Co., Ltd., Nagano (JP)

( * ) Notice: Subject to any disclaimer, the term of this patent is extended or adjusted under 35 U.S.C. 154(b) by 47 days.

(21) Appl. No.: 13/499,692

(22) PCT Filed: Sep. 14, 2010

(86) PCT No.: PCT/JP2010/065844
§ 371 (c)(1),
(2), (4) Date: Apr. 13, 2012

(87) PCT Pub. No.: WO2011/040235
PCT Pub. Date: Apr. 7, 2011

(65) Prior Publication Data
US 2012/0186407 A1  Jul. 26, 2012

(30) Foreign Application Priority Data
Oct. 1, 2009  (JP) ................................ 2009-229280

(51) Int. Cl.
B23B 13/02   (2006.01)
B23B 15/00   (2006.01)

(52) U.S. Cl.
USPC ................................................ 82/124; 82/125

(58) Field of Classification Search
USPC ..................... 82/124, 125, 126, 127
See application file for complete search history.

(56) References Cited

U.S. PATENT DOCUMENTS

| | | | | |
|---|---|---|---|---|
| 3,650,412 A | * | 3/1972 | Neary | 414/18 |
| 4,068,545 A | * | 1/1978 | Scheler | 82/1.11 |
| 5,347,896 A | * | 9/1994 | Jones | 82/125 |
| 5,505,584 A | * | 4/1996 | Berns | 414/745.1 |
| 7,302,877 B2 | * | 12/2007 | Cucchi | 82/124 |

FOREIGN PATENT DOCUMENTS

| | | |
|---|---|---|
| JP | 53-76283 | 6/1978 |
| JP | 59-17101 | 2/1984 |
| JP | 07-328803 | 12/1995 |
| JP | 2007-118163 | 5/2007 |
| JP | 3134196 | 7/2007 |

* cited by examiner

*Primary Examiner* — Will Fridie, Jr.
(74) *Attorney, Agent, or Firm* — Howson & Howson LLP (57) ABSTRACT

There is provided a work supplying apparatus for automatically and smoothly supplying workpieces having various shapes and sizes from a rear end of a hollow spindle in a machine tool or assembling machine. The work supplying apparatus has a work pushing means for pushing the workpiece held by a holding means into a chuck, and a pusher for pushing and holding the workpiece supplied to a work receiver in the direction of the holding means.

4 Claims, 9 Drawing Sheets

MACHINE TOOL

TECHNICAL FIELD

The present invention relates to a work supplying apparatus for supplying workpieces to an operating machine such as a machine tool and to a processing system having such work supplying apparatus.

BACKGROUND ART

Hitherto, it has been a widely used technology to supply workpieces into a hollow spindle having a chuck at a front end by pushing them from a rear end thereof. A work supplying apparatus therefor is also known.

For instance, there has been known a work supplying apparatus for supplying long workpieces by pushing them into a hollow spindle from a rear end by means of a bar feeder having a feed rod with a finger chuck for holding the workpieces at a front end thereof in order to feed the workpieces sequentially to machine tools such as an automatic lathe, as disclosed in Japanese Laid-open Utility Model Application No. S59-156705 (Page 1, FIG. 1) for example.

There has been also known a work supplying apparatus for supplying short workpieces that are to be individually processed by supplying the workpieces from the rear end of a hollow spindle and by pushing the workpieces by a work pushing means, as disclosed in Japanese Laid-open Utility Model Application No. S62-7301 (Page 1, FIG. 1) for example.

However, the former work supplying apparatus has a problem that it is not easy to supply short workpieces to the automatic lathe because it does not support the short workpieces. The latter work supplying apparatus also has a problem that, because it just pushes in the workpieces, smooth supply may become difficult depending on the shape, size and other properties of the workpieces.

SUMMARY OF THE INVENTION

In order to solve the aforementioned problems, according to a first aspect of the invention, there is provided a work supplying apparatus comprising a work pushing means for pushing a workpiece into a hollow spindle having a chuck at a front end thereof from a rear end thereof, and a work supplying means for individually supplying workpieces to the work pushing means, the work supplied from the work supplying means being pushed into the spindle by the work pushing means. The work pushing means is provided with a holding means for holding the work at an end thereof, the work supplying means is provided with a work moving means for moving the workpiece so that the holding means holds the workpiece, and the workpiece is supplied to the spindle while being held by the holding means.

According to a second aspect of the invention, the work moving means comprises a pusher for pushing the workpiece to the holding means.

According to a third aspect of the invention, the work supplying means has a positioning means for positioning the holding means in holding the workpiece.

According to a fourth aspect of the invention, the work moving means is movable to an operating position for moving the work to the holding means and to a receding position for permitting the work pushing means to supply the workpiece to the spindle.

According to a fifth aspect of the invention, the work pushing means is a feed rod of a bar feeder for supplying long rod members, and the work supplying means is provided on the side from which the feed rod projects.

According to a sixth aspect of the invention, the work supplying means has a guide means for guiding the work pushing means in supplying the workpiece to the spindle.

According to a seventh aspect of the invention, a processing system comprises the work supplying apparatus as described in the sixth aspect disposed between the automatic lathe and the bar feeder and is configured to be able to supply the rod member to the spindle of the automatic lathe by the feed rod of the bar feeder and to supply the workpiece held by the holding means by pushing into the spindle of the automatic lathe by the feed rod of the bar feeder by the work supplying means.

ADVANTAGEOUS EFFECTS OF THE INVENTION

According to the first aspect of the work supplying apparatus of the invention, because the holding means provided at the end of the work pushing means holds the workpiece, and pushes and supplies the workpiece from a rear end of the spindle, it becomes possible to supply various workpieces smoothly.

Moreover, because the work supplying means has a work moving means for moving the workpiece so as to be held by the holding means, it becomes possible to automate the supply of the workpiece to the holding means and to supply a large number of short-length workpieces readily and continuously.

According to the arrangement described in the second aspect of the work supplying apparatus of the invention, because the work moving means comprises a pusher for pushing the workpiece to the holding means, it becomes possible to hold various workpieces by the holding means with a simple structure.

According to the arrangement described in the third aspect of the work supplying apparatus of the invention, because the work supplying means has a positioning means for positioning the holding means in holding the workpiece, the holding means can hold the workpiece more smoothly and more securely.

According to the arrangement described in the fourth aspect of the work supplying apparatus of the invention, because the work moving means is movable to the operating position for moving the workpiece to the holding means, and to the receding position for permitting the work pushing means to supply the workpiece to the spindle, it readily becomes possible to switch the movement of the workpiece to the holding means and the supply of the workpiece by the work pushing means.

According to the arrangement described in the fifth aspect of the work supplying apparatus of the invention, the work supplying apparatus of the invention can be applied without modifying a conventional long rod member supplying bar feeder, and various workpieces can be supplied, to an automatic lathe or other machine tool, from the work supplying apparatus of the invention or from the bar feeder.

According to the arrangement described in the sixth aspect of the work supplying apparatus of the invention, because the guide means guides the reciprocating movements of the work pushing means, it becomes possible to supply the workpieces smoothly and also to let the guide means function as a guide in supplying a long rod member.

According to the arrangement described in the seventh aspect of the processing system of the invention, it is possible to process both rod members and short members such as raw blanks by supplying such members to the spindle in the condition in which the work supplying apparatus as described in the sixth aspect is disposed between the automatic lathe and the bar feeder.

The specific nature of the invention, as well as other objects, uses and advantages thereof, will clearly appear from the following description and from the accompanying drawings.

BEST MODE FOR CARRYING OUT THE INVENTION

Embodiment

Figure 1:
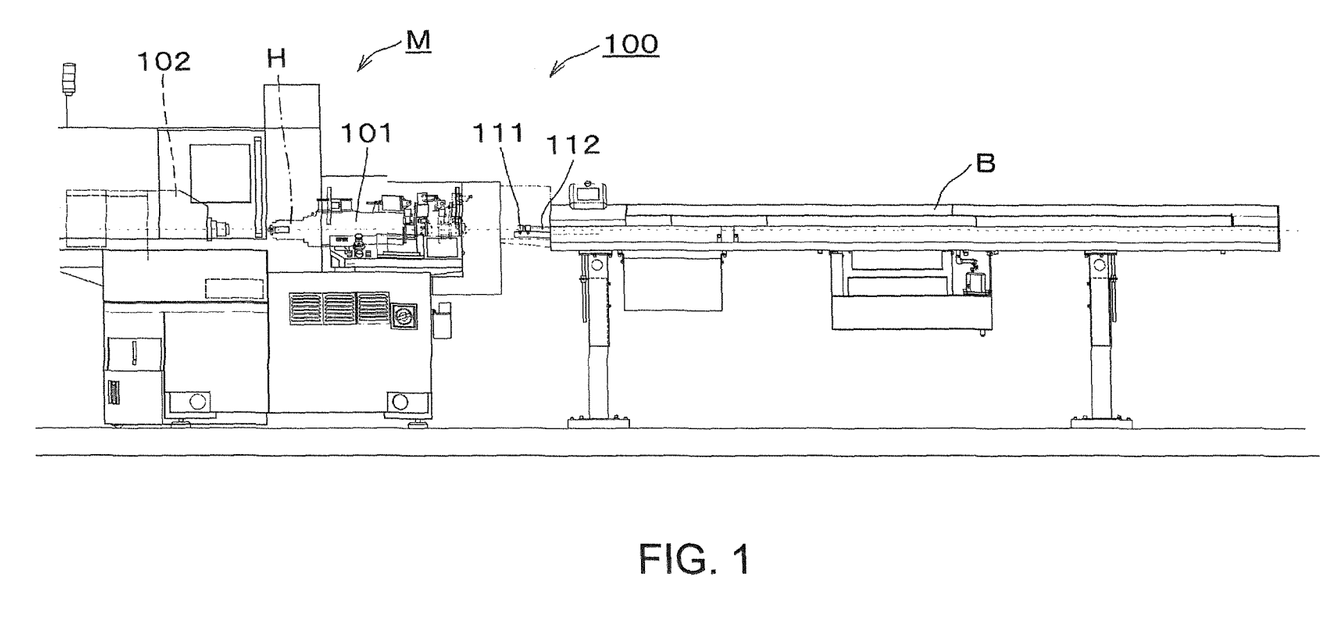
FIG. 1 is a side view of an automatic processing system having a work supplying apparatus of the invention.
Figure 2:
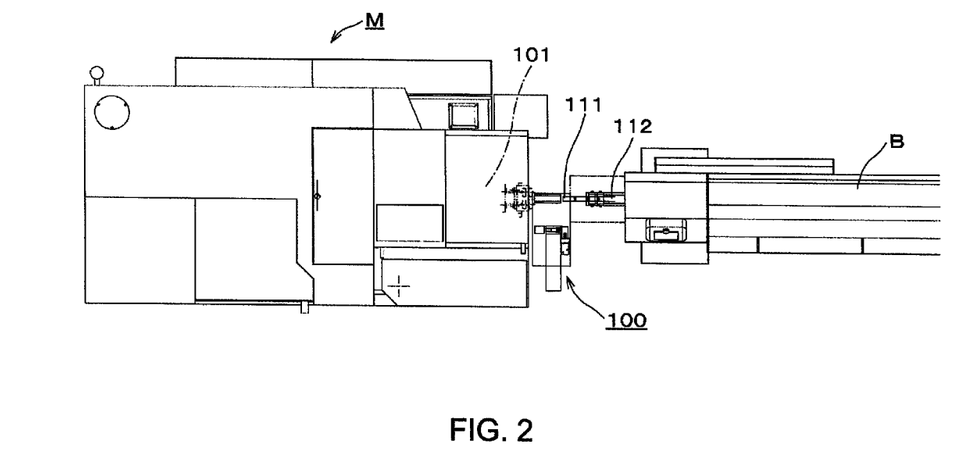
FIG. 2 is a plan view of the automatic processing system having the work supplying apparatus of the invention.

FIGS. 1 and 2 show a processing system comprising a work supplying apparatus 100 of an embodiment of the invention. In the arrangement of the processing system, the work supplying apparatus 100 is disposed between an automatic lathe M and a bar feeder B.

Figure 8:
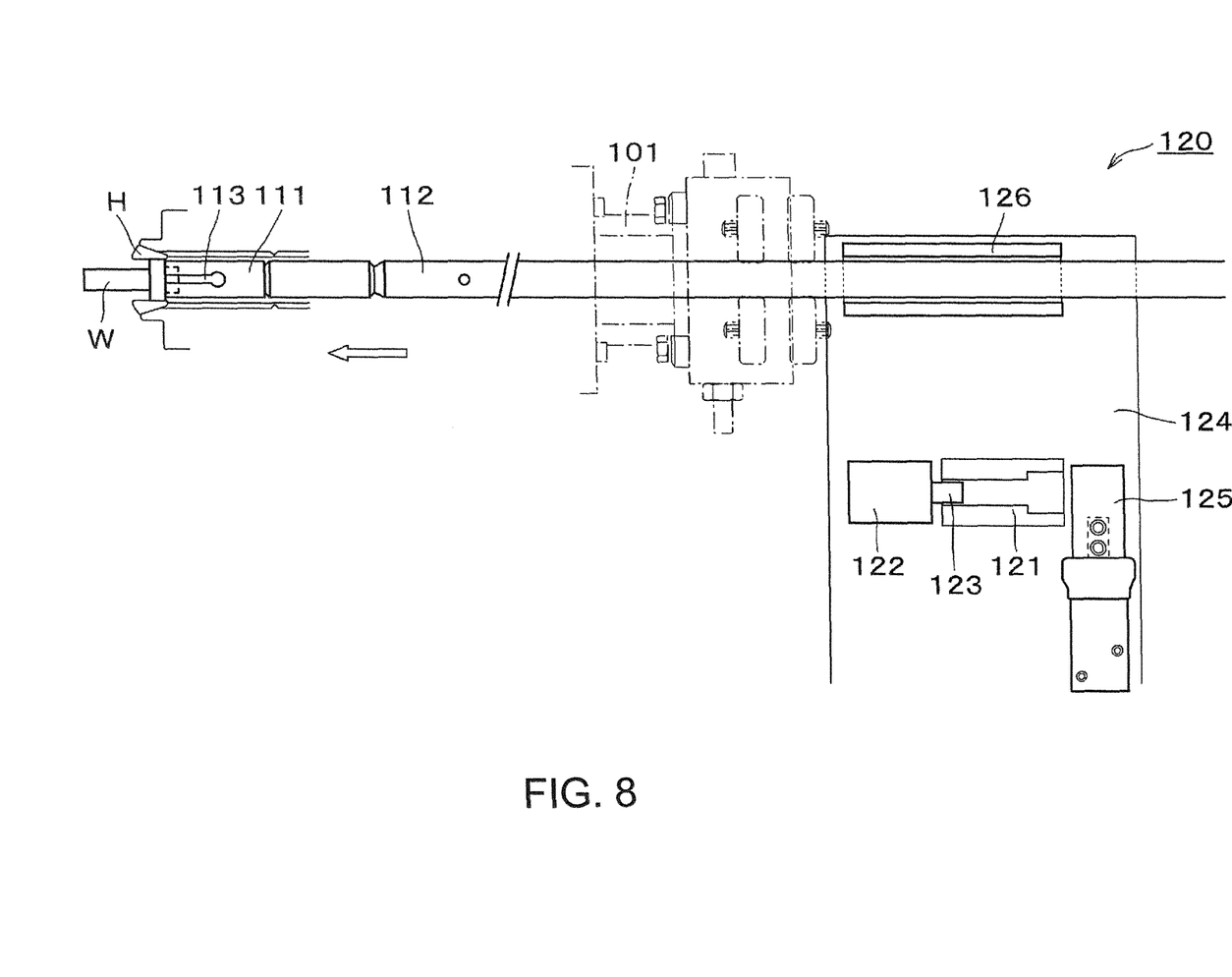
FIG. 8 is a plan view in pushing the workpiece of the work supplying apparatus of the invention.
Figure 9:
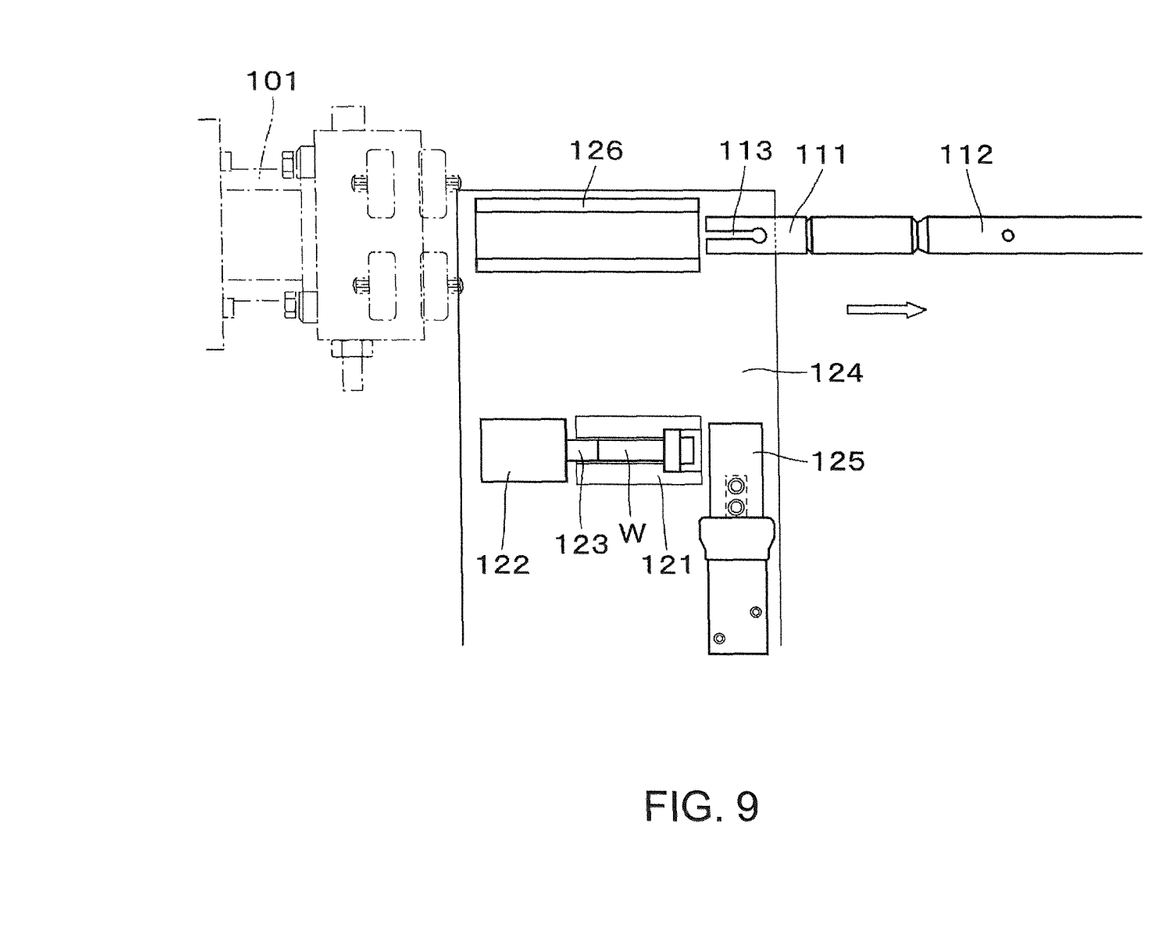
FIG. 9 is a plan view after completing pushing of the workpiece of the work supplying apparatus of the invention.

The automatic lathe M is a known automatic lathe and has a rotatable and drivable hollow spindle 101. A chuck H as shown in FIG. 8 is provided at a front end of the spindle 101 so that a processing tool can machine a workpiece gripped by the chuck H.

The bar feeder B is a known bar feeder having a body within which a long rod member is stored, and has a feed rod 112 slidable in the direction of the axis of spindle 101 of the automatic lathe M. The bar feeder B and the automatic lathe M are disposed so that the feed rod 112 and the spindle 101 are positioned on the same axial line.

A finger chuck 111 for holding the rear end of a rod member is attached at the front end of the feed rod 112 to serve as a holding means for holding a workpiece. The feed rod 112 is movable between a position separate from, and behind, the rear end of the spindle 101, and a position within the spindle 101.

The bar feeder B is arranged to push and supply a selected rod member into the spindle 101 from the rear end of the spindle 101 by moving the feed rod 112 in the axial direction of the spindle 101 while holding the rear end of the rod member in the finger chuck 111.

The processing system supplies the rod member and inserts the rod member into the spindle 101 of the automatic lathe M by means of the bar feeder B from the rear end of the spindle 101 as described above so that rod members are processed sequentially by the automatic lathe M.

Figure 3:
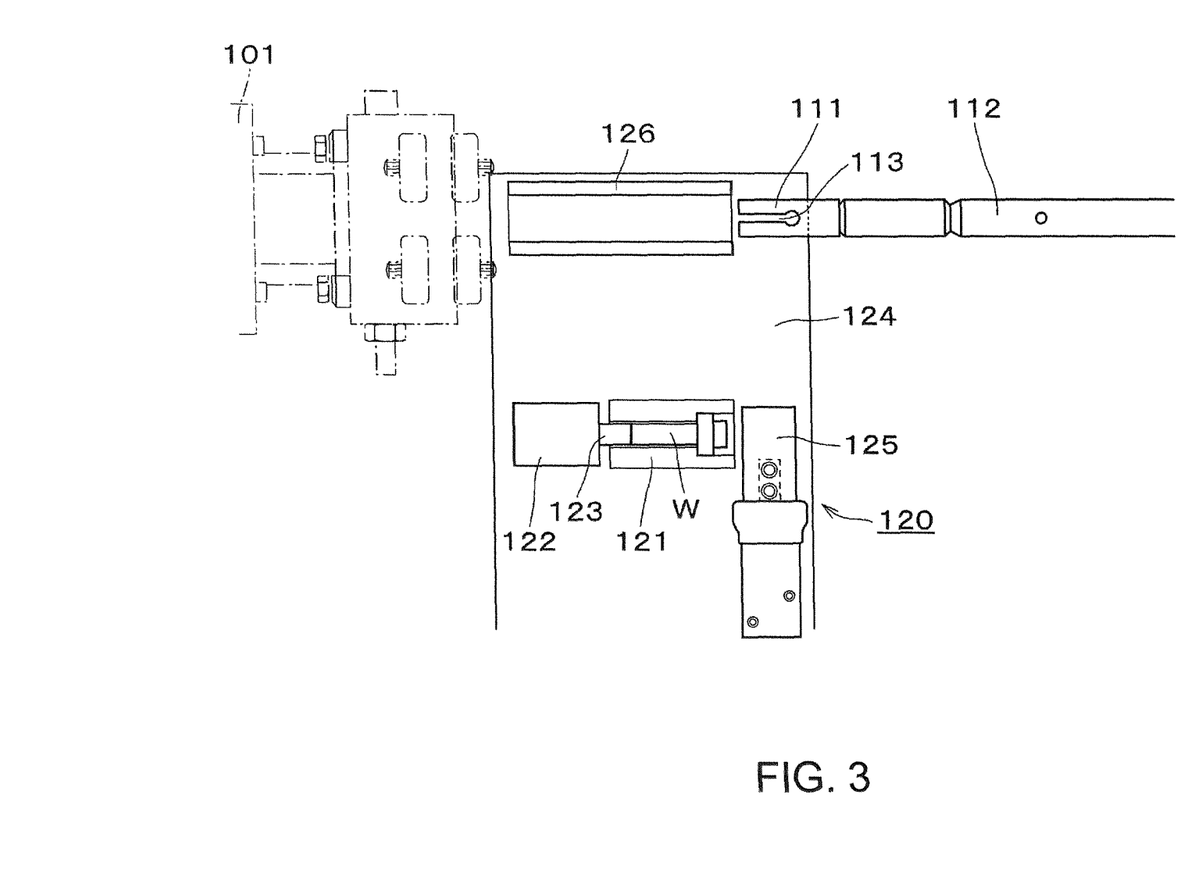
FIG. 3 is a plan view of an initial position of the work supplying apparatus of the invention.

As shown in FIG. 3, the work supplying apparatus 100 comprises a reciprocating table 124, movable forward and backward in a horizontal direction orthogonal to the axis of the spindle 101. A work receiver 121, a pusher 122, a finger pressing mechanism 125, and a guide member 126 are provided on the reciprocating table 124.

By moving forward and backward as described above, the reciprocating table 124 is arranged to switch between a guiding position in which the guide member 126 is located between the feed rod 112 and the rear end of the spindle 101 when the feed rod 112 is separated from the spindle 101, and a supplying position in which the work receiver 121 is located between the feed rod and the spindle.

The guide member 126 extends in the axial direction of the spindle 101 so as to be able to guide the feed rod 112 together with the finger chuck 111 along the axial direction of the spindle 101 when the reciprocating table 124 is in the guiding position.

The work receiver 121 accommodates a raw blank, i.e., a workpiece formed into a predetermined shape in advance as a short-length workpiece. The raw blank is accommodated in the work receiver 121 so that the work receiver 121 serves as a positioning means for the raw blank. In the present embodiment raw blanks are supplied to the work receiver 121 one by one by a conventionally known parts feeder or the like. It is possible to construct the work receiver 121 so that it uses vacuum retention, an openable chuck, or the like, to position the raw blanks with high precision.

The pusher 122 is composed of a cylinder disposed to face the work receiver 121, and pushes the raw blank out of the work receiver 121 by pressing the raw blank within the work receiver 121 by projecting a piston rod 123 from the cylinder. The pusher 122 serves as a work moving means for moving the workpieces.

The pusher 122 pushes the raw blank out of the work receiver 121 as described above and moves the raw blank toward the finger chuck 111 when the reciprocating table 124 is in the supplying position facing the finger chuck 111. Thus, the raw blank can be inserted and supplied to the finger chuck 111. It is also possible to use a chuck for gripping the workpiece as a work moving means, moving the chuck relative to the finger chuck 111 while the chuck is gripping the workpiece The finger pressing mechanism 125 is disposed on side of the work receiver 121 opposite from the pusher 122, and positions the finger chuck 111 by pinching or in a similar manner when the reciprocating table 124 is in the supplying position. Thus, the finger pressing mechanism 125 serves as a positioning means for positioning the finger chuck 111 when the finger chuck 111 is holding the raw blank. However, the finger chuck 111 can be fixed by mechanisms other than the finger pressing mechanism.

By using the finger pressing mechanism 125 to position the finger chuck 111, it becomes possible to prevent vibration of the finger chuck 111 caused by vibration of the feed rod 112 or other causes, and to supply raw blanks and insert them and into the finger chuck 111 in a stable manner. Thus, the pusher 122, the work receiver 121 and the finger pressing mechanism 125 compose a work supplying means 120 for individually supplying raw blanks to the finger chuck 111.

After supplying the raw blank to the finger chuck 111, the pusher 122, the work receiver 121, and the finger pressing mechanism 125, recede from the position facing the finger chuck 111 by movement of the reciprocating table 124 to the guide position. The guide member 126 then faces the finger chuck 111, so that it is possible to supply the raw blank to the spindle 101 by pushing it into the rear end of the spindle 101 by moving the feed rod 112 along the axial direction of the spindle 101 while using the guide member 126 to guide the raw blank integrally with the finger chuck 111.

The automatic lathe M can process the supplied raw blank pushed into its spindle 101 as described above by the processing tool while gripping the raw blank in the chuck H. The feed rod 112 is pulled out of the spindle 101 and is separated from the rear end of the spindle 101 after the chuck H of the spindle 101 grips the raw blank.

The pusher 122 is placed on the reciprocating table 124 integrally with the work receiver 121 as described above, and moves integrally with the reciprocating table 124 on forward and backward operation of the reciprocating table. The pusher 122 is located at an operation position for pushing and moving the workpiece into the finger chuck 111 when the reciprocating table 124 is in the supplying position, and is located at the receding position where the raw blank can be supplied to the spindle 101 by the feed rod 112 when the reciprocating table 124 is in the guide position.

As described above, the feed rod 112 and the finger chuck 111 of the bar feeder B serve both as a work pushing means of the work supplying apparatus 100 for pushing and supplying the raw blank to the spindle 101 from the rear end thereof, and as a holding means provided at the front end of the work pushing means for holding the raw blank. The pusher 122 will not hamper the pushing and insertion of rod members or raw blanks into the spindle 101 because it can be moved to the receding position by changing the position of the reciprocating table 124 to the guide position, where the operation of supplying the raw blank to the finger chuck 111 cannot take place.

When the reciprocating table 124 is in the guide position, the guide member 126 guides the feed rod 112 integrally with the finger chuck 111 and does not hamper the supply of the rod member to the spindle 101. That is, the supply of the rod member to the spindle 101 is carried out smoothly, and the operation of pushing and inserting the rod member and the raw blank into the spindle 101 can be smoothly carried out as the feed rod 112 (including the finger chuck 111) is guided by the guide member 126. The guide member 126 can also guide the workpiece.

The processing system can carry out the operation of supplying a rod member to the spindle 101 by the bar feeder B by setting the reciprocating table 124 to the guide position, and can also carry out the operation of supplying a raw blank to the spindle 101 by the feed rod 112, both utilizing the bar feeder B as it is, by changing the positions of the reciprocating table 124 as described above, and without changing its configuration at all. With this arrangement, it becomes possible to realize a low-cost and space-saving processing system, which requires no other loader such as a gantry loader, and which can process both rod members, and short members such as raw blanks.

In this case, a three-jaw chuck, or other device capable of gripping both normal rod members and raw blanks, can be used for the chuck H of the spindle 101. Although the distance between the automatic lathe M and the bar feeder B is wide because the work supplying apparatus 100 is provided between the automatic lathe M and the bar feeder B, long rod members can be smoothly supplied to the spindle 101 because the guide member 126 of the work supplying apparatus 100 is located on the axial line.

Moreover, the processing system of the present embodiment can be readily realized by adding the work supplying apparatus 100 to a conventional rod member processing system comprising an automatic lathe and a bar feeder. It thereby becomes unnecessary to prepare processing systems for rod members and for raw blanks separately, and it is possible to process workpieces efficiently. Moreover, it becomes possible to realize a work supplying apparatus capable of supplying both rod members and raw blanks by adding the work supplying apparatus 100 to a conventional bar feeder.

The finger chuck 111 may be designed to handle both raw blanks and rod members, or one in which a raw blank is to be inserted can be attaching to the feed rod 112, replacing one which holds a rod member. The work receiver 121 can be replaced to accommodate raw blanks having different shapes and sizes. The driving force for causing the piston rod 123 of the pusher 122 to project and recede can be generated by any of various mechanisms such as mechanical, electromagnetic, or hydraulic mechanisms.

The operation of the work supplying apparatus 100 of the embodiment constructed as described above will be explained below. At first, as shown in FIG. 3, the reciprocating table 124 is located in the guide position (receding position of the work moving means) where the guide member 126 is located between the feed rod 112 separated from the spindle 101 and the rear end of the spindle 101 and the rear end of the spindle 101 and the finger chuck 111 recedes to a position where the finger chuck 111 can receive the workpiece W supplied to the work receiver 121. The piston rod 123 of the pusher 122 also recedes to the spindle side of the short workpiece W such as the raw blank supplied to the work receiver 121.

Figure 4:
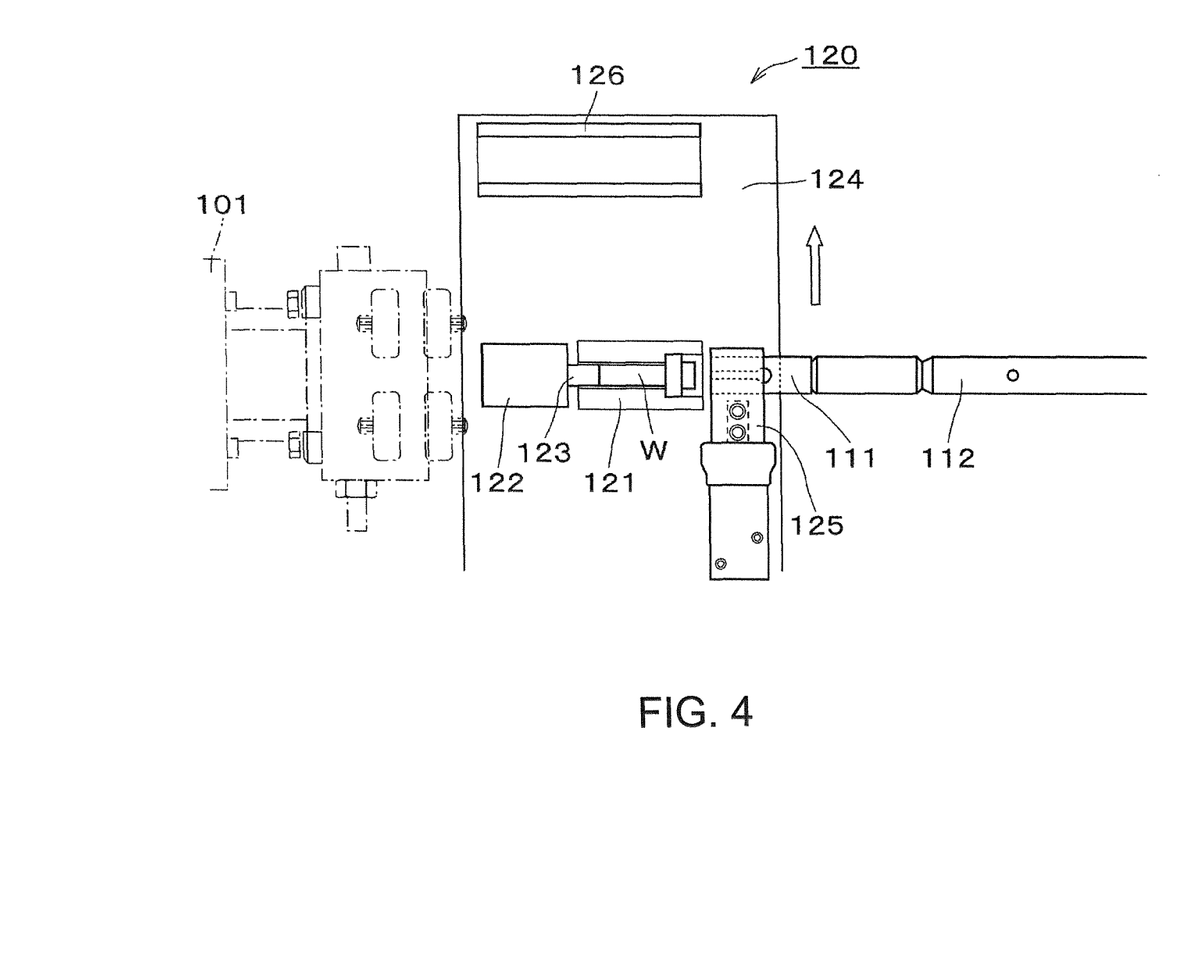
FIG. 4 is a plan view in starting an operation for holding a workpiece in a finger chuck of the work supplying apparatus of the invention.

Next, the reciprocating table 124 moves to the supplying position (operating position of the work moving means) in which the work receiver 121 is located between the feed rod 112 separated from the spindle 101 and the rear end of the spindle 101 as shown in FIG. 4 and the work receiver 121 confronts to the finger chuck 111. At this time, the finger pressing mechanism 125 operates to position and fix the finger chuck 111.

Figure 5:
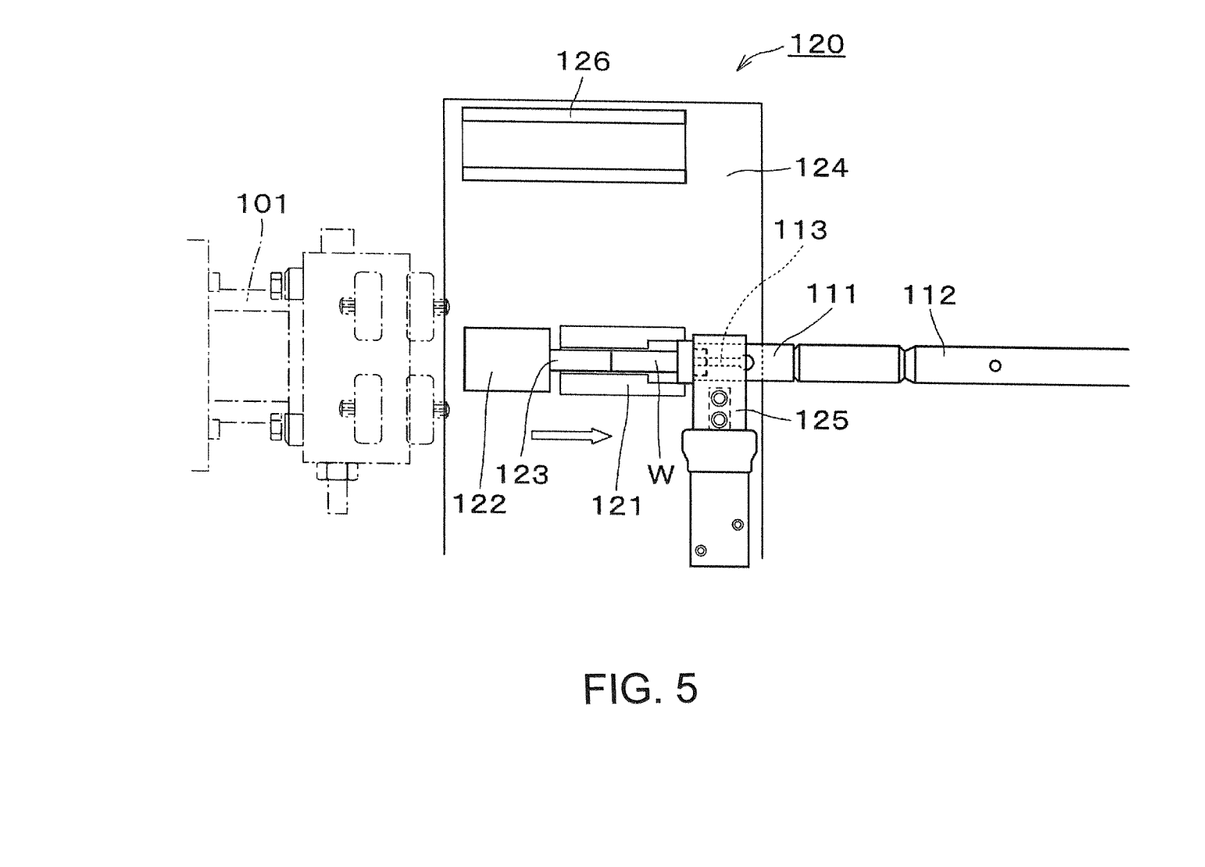
FIG. 5 is a plan view in operating a pusher of the work supplying apparatus of the invention.

Next, the piston rod 123 of the pusher 122 projects to push the workpiece W in the direction of the finger chuck 111 so as to be held by the finger chuck 111 as shown in FIG. 5. In the present embodiment, the finger chuck 111 is provided with a slot 113 extending from its end, and the workpiece W is held by elasticity thereof when it is inserted into the end portion of the finger chuck 111. However, the workpiece may be held by holding means having another configuration such as an air retention or magnetic retention mechanism.

Figure 6:
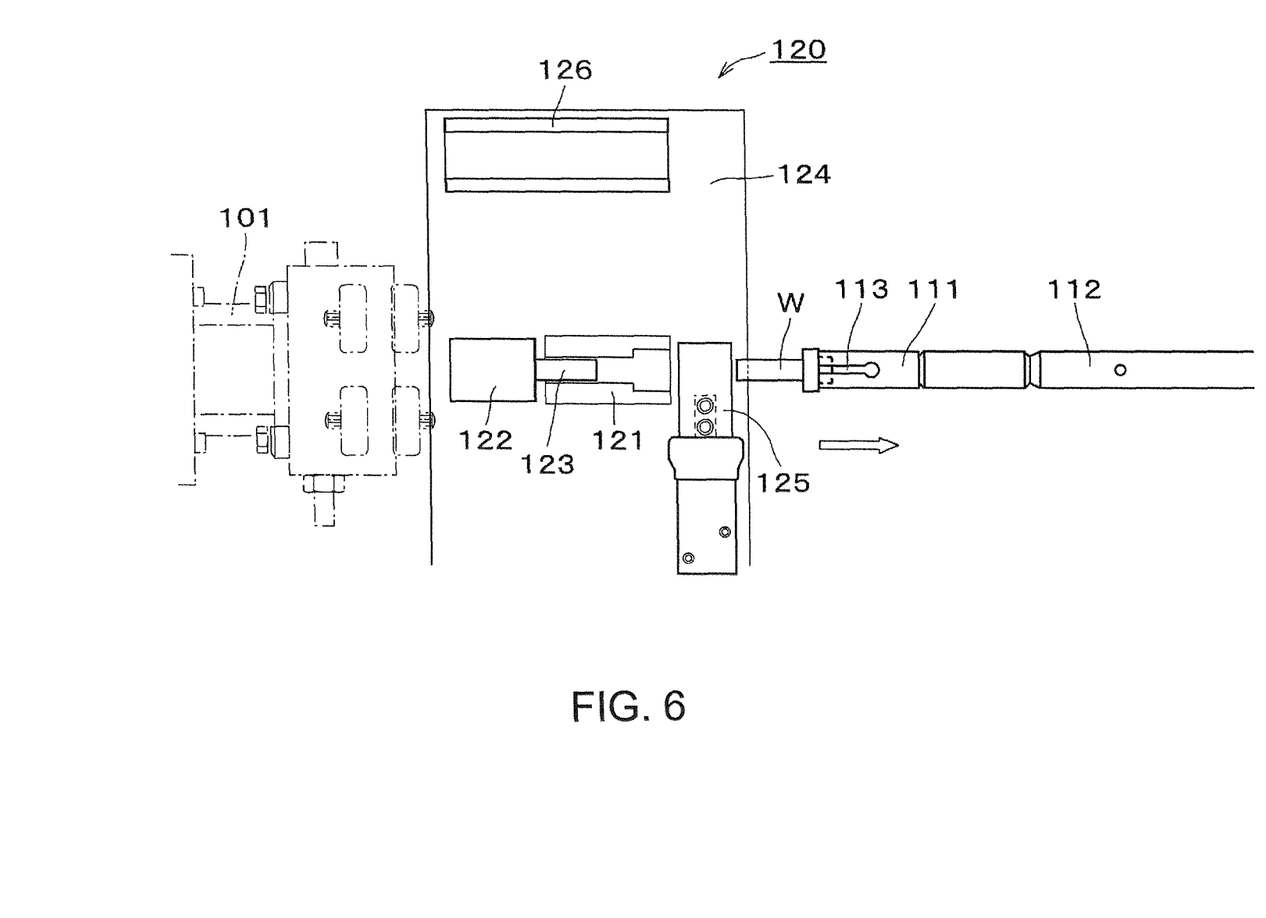
FIG. 6 is a plan view after holding the workpiece by the finger chuck of the work supplying apparatus of the invention.

Next, after the finger pressing mechanism 125 releases the positioning and fixation of the finger chuck 111, the finger chuck 111, holding the workpiece W, recedes to a position where the workpiece W is completely taken out of the work receiver 121 as shown in FIG. 6.

Figure 7:
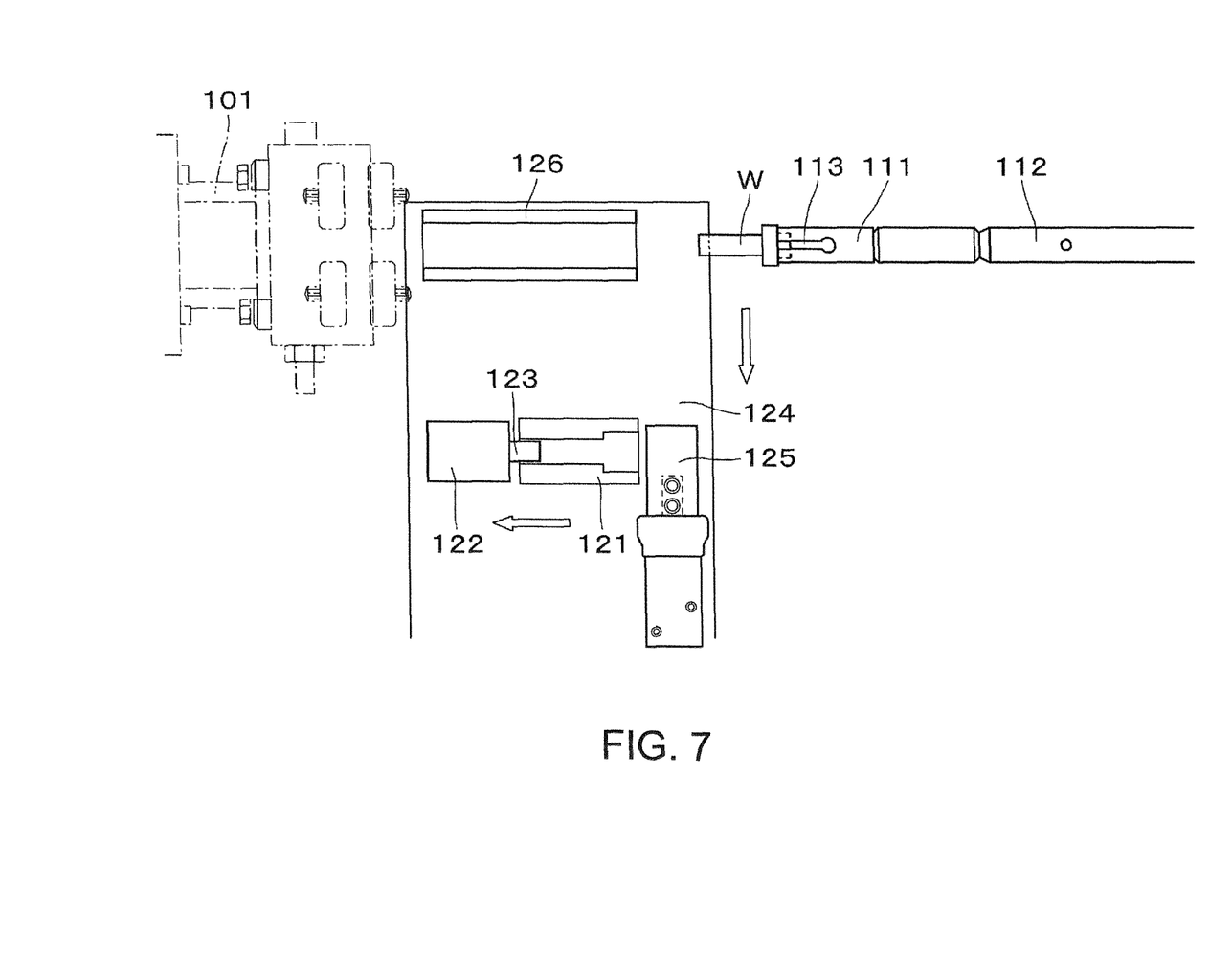
FIG. 7 is a plan view in starting to push the workpiece of the work supplying apparatus of the invention.

Then, as shown in FIG. 7, the reciprocating table 124 moves to the position (the receding position of the work moving means) of the guide position described above, and the guide member 126 confronts the finger chuck 111 holding the workpiece W. At this time, the piston rod 123 of the pusher 122 also recedes so that the next workpiece W can be supplied to the work receiver 121.

Next, the workpiece W, held by the finger chuck 111 passes through the guide member 126 and is pushed to the front end of the spindle 101 as shown in FIG. 8. When the workpiece W is gripped by the chuck H, the finger chuck 111 has completed the supply of the workpiece W, and returns to the position where it can receive a next workpiece W supplied to the work receiver 121. Then, the next workpiece W is supplied to the work receiver 121. Thus, the series of operations is repeated, and a large number of workpieces W can be supplied continuously to the chuck H at the front end of the spindle 101.

The operations, from the condition shown in FIG. 3 to the condition shown in FIG. 7, i.e., the operations from when the reciprocating table 124 moves from the position of the guide position to the position (operating position of the work moving means) of the supplying position, the workpiece W is pushed out of the work receiver 121 to be held by the finger chuck 111, the finger chuck 111 recedes and the reciprocating table 124 moves to the position of the guide position (receding position of the work moving means) and until the guide member 126 confronts the finger chuck 111 holding the workpiece W, can be carried out in parallel while the previously supplied workpiece W is processed while being gripped by the chuck H at the front end of the spindle 101. Thus it becomes possible to reduce the handling time not involved in processing, and to shorten overall processing time for each workpiece. Specifically, the workpieces can be replenished to the work receiver 121 when another workpiece is held by the finger chuck 111, and the reciprocating table 124 is switched to the supplying position, so that the supply of the workpiece W to the finger chuck 111 can be carried smoothly in a short time.

It is also possible to insert the feed rod 112 through the spindle 101, and to cause the next workpiece to stand by within the spindle 101 while processing the workpiece W by the spindle 101, or in passing the workpiece from the spindle 101 to a back spindle. Note that it is desirable to position the work to be processed next immediately behind the chuck H when a work is caused to stand by within the spindle 101.

When a tool 102 facing to the spindle 101 is provided as in the automatic lathe M described above, it is possible to supply the workpiece W by passing the feed rod 112 through the spindle 101, and by causing a chuck of the tool 102 to grip the workpiece W. When a workpiece requires an inner-diameter chuck in particular, it becomes possible to process the workpiece W by the tool 102 by attaching the inner-diameter chuck to the tool 102 and by causing the inner-diameter chuck to grip the workpiece W.

It is noted that the timing of receding of the piston rod 123 of the pusher 122 and the timing of supplying the next workpiece W to the work receiver 121 are not limited to those described above, and may be carried out at appropriate times within the series of operations.

It is also noted that the work supplying apparatus 100 of the invention has been explained by exemplifying the case when it is applied to the automatic lathe M in the embodiment described above. The work supplying apparatus 100 may be used in any processing machines, assembling apparatuses, and processing apparatuses as long as the system is what supplies workpieces to a hollow spindle having a chuck at a front end thereof by pushing the workpieces from a rear end thereof.

The invention claimed is:

1. A machine tool comprising an automatic lathe including a hollow spindle rotatable on a spindle axis and having a chuck at a front end thereof, a bar feeder for supplying a rod member to the spindle through a rear end of the spindle and alternatively to supply a raw blank, formed in advance into a predetermined shape, to the spindle through said rear end of the spindle, and work supplying apparatus positioned between said automatic lathe and said bar feeder, the work supplying apparatus comprising:
   a work pushing means for pushing the raw blank into the spindle;
   a work supplying means for individually supplying raw blanks to the work pushing means; and
   a guide means for guiding the work pushing mean,
   the work supplying means and the guide means being integrally connected to each other and alternately movable to a position on the spindle axis between the spindle and the bar feeder;
   the work pushing means comprising a feed rod of the bar feeder, the feed rod being movable along the spindle axis and being capable of pushing a rod member to the spindle and alternatively holding a raw blank; and
   the work supplying means comprising a work receiver for supporting a raw blank and a work moving means for moving the raw blank supported by the work receiver into engagement with the feed rod,
whereby:
   when a raw blank is to be processed by the automatic lathe, the work supplying means moves the raw blank from the work receiver so as to be held by the feed rod while the work receiver is positioned on said spindle axis, and said raw blank is then moved into the spindle through the guide member by the feed rod while the guide member is positioned on said spindle axis between the spindle and the bar feeder, and
   when a rod member is to be processed by the automatic lathe, the rod member is movable into the spindle through the guide member by the feed rod while the guide member is positioned on said spindle axis between the spindle and the bar feeder.

2. The machine tool according to claim 1, wherein said work moving means comprises a pusher for pushing a raw blank into engagement with said feed rod.

3. The machine tool according to claim 1, wherein said work supplying means includes a positioning means for positioning said feed rod when a raw blank is being moved by said work moving means into engagement with the feed rod.

4. The machine tool according to claim 1, wherein said work moving means is movable to an operating position for moving a raw blank into engagement with said feed rod, and to a receding position for permitting said feed rod to move a raw blank or a rod member into said spindle.

* * * * *